(12) United States Patent
Nishikawa

(10) Patent No.: US 8,798,163 B2
(45) Date of Patent: Aug. 5, 2014

(54) VIDEO DECODER AND DIGITAL BROADCAST TRANSRECEIVER

(75) Inventor: Sho Nishikawa, Kanagawa (JP)

(73) Assignee: Fujitsu Semiconductor Limited, Yokohama (JP)

( * ) Notice: Subject to any disclaimer, the term of this patent is extended or adjusted under 35 U.S.C. 154(b) by 426 days.

(21) Appl. No.: 12/723,853

(22) Filed: Mar. 15, 2010

(65) Prior Publication Data

US 2010/0172413 A1    Jul. 8, 2010

Related U.S. Application Data

(63) Continuation of application No. PCT/JP2007/068703, filed on Sep. 26, 2007.

(51) Int. Cl.
*H04N 7/12* (2006.01)
*H04N 7/26* (2006.01)
*H04N 7/50* (2006.01)

(52) U.S. Cl.
CPC ... *H04N 19/00933* (2013.01); *H04N 19/00278* (2013.01); *H04N 19/00133* (2013.01); *H04N 19/00903* (2013.01); *H04N 19/00781* (2013.01); *H04N 19/00533* (2013.01); *H04N 19/00218* (2013.01); *H04N 19/00012* (2013.01)
USPC .................................................. 375/240.25

(58) Field of Classification Search
USPC ............... 375/130–153, 240.01–240.29; 704/500–504
IPC ..... G10L 19/00,21/04; H04B 1/00, 1/66; H04N 7/12, 11/02, 11/04
See application file for complete search history.

(56) References Cited

U.S. PATENT DOCUMENTS

| | | | | |
|---|---|---|---|---|
| 6,128,339 A * | 10/2000 | Park | .................. | 375/240.27 |
| 6,594,790 B1 * | 7/2003 | Sato et al. | .................. | 714/746 |
| 6,704,363 B1 * | 3/2004 | Kim | .................. | 375/240.27 |
| 2002/0066104 A1 * | 5/2002 | Shibusawa | .................. | 725/70 |
| 2005/0062885 A1 * | 3/2005 | Kadono et al. | .................. | 348/407.1 |
| 2010/0166071 A1 * | 7/2010 | Wu et al. | .................. | 375/240.16 |

FOREIGN PATENT DOCUMENTS

| | | |
|---|---|---|
| JP | 2000-115654 | 4/2000 |
| JP | 2002-064759 | 2/2002 |
| JP | 2003-069915 | 3/2003 |
| JP | 2004-320394 | 11/2004 |
| JP | 2005-260605 | 9/2005 |
| JP | 2006-157948 | 6/2006 |
| JP | 2006-203598 | 8/2006 |
| JP | 2006-352911 | 12/2006 |
| JP | 2007-036816 | 2/2007 |
| JP | 2007-096802 | 4/2007 |

OTHER PUBLICATIONS

International Preliminary Report on Patentability dated Mar. 30, 2010.

(Continued)

*Primary Examiner* — Richard Torrente
(74) *Attorney, Agent, or Firm* — Fujitsu Patent Center

(57) ABSTRACT

A video decoder includes a storage unit that stores therein vector data; and a video generating unit that, when an input stream is abnormal, generates based on data before the input stream became abnormal and the vector data stored in the storage unit, an image that is an image displayed using the data before the input stream became abnormal and to which motion has been added.

18 Claims, 9 Drawing Sheets

(56) References Cited

OTHER PUBLICATIONS

Patent Abstracts of Japan, Publication No. 2000-115654, published Apr. 21, 2000.
Patent Abstracts of Japan, Publication No. 2002-064759, published Feb. 28, 2002.
Patent Abstracts of Japan, Publication No. 2003-069915, published Mar. 7, 2003.
Patent Abstracts of Japan, Publication No. 2004-320394, published Nov. 11, 2004.
Patent Abstracts of Japan, Publication No. 2005-260605, published Sep. 22, 2005.
Patent Abstracts of Japan, Publication No. 2005-157948, published Jun. 15, 2005.
Patent Abstracts of Japan, Publication No. 2006-203598, published Aug. 3, 3006.
Patent Abstracts of Japan, Publication No. 2006-352911, published Dec. 28, 2006.
Patent Abstracts of Japan, Publication No. 2007-036816, published Feb. 8, 2007.
Patent Abstracts of Japan, Publication No. 2007-096802, published Apr. 12, 2007.
International Search Report dated Nov. 13, 2007 in PCT/JP2007/068703.
Written Opinion (PCT/ISA/237) dated Nov. 13, 2007 in PCT/JP2007/068703).

* cited by examiner

VIDEO DECODER AND DIGITAL BROADCAST TRANSRECEIVER

This application is a continuation application, filed under 35 U.S.C. §111(a) of International Application PCT/JP2007/068703, filed Sep. 26, 2007, the entire contents of which are incorporated herein by reference.

FIELD

The embodiments discussed herein are related to a video decoder and a digital broadcast transreceiver.

BACKGROUND

FIG. 8 is a diagram of a configuration of a conventional MPEG-2 video decoder. As depicted in FIG. 8, with a conventional MPEG-2 video decoder 1, a video stream input thereto is subjected to variable length decoding by a variable length codec 2, inverse quantization by an inverse quantization unit 3, and inverse discrete cosine transform by an inverse discrete cosine transform unit 4. If the data input is intradata, a switch 5 switches the path to the side of the inverse discrete cosine transform unit 4 and data output from the inverse discrete cosine transform unit 4 is stored as is in a frame buffer 6. On the other hand, if the data is interdata, the switch 5 switches the path to the side of an adder 7 that, based on vector data and reference frame data, adds and stores to the frame buffer 6, data generated from a motion compensation estimate by a motion compensation estimating unit 8 and data output from the inverse discrete cosine transform unit 4. Strictly speaking, configuration of an MPEG-1 or MPEG-4 video decoder differs from this configuration, but is for the most part similar.

FIG. 9 is a diagram of a configuration of a conventional H.264 video decoder. As depicted in FIG. 9, in a conventional H.264 video decoder 11, video stream input thereto is subject to variable length decoding by a variable length codec 12 and, inverse quantization and inversion by an inverse quantization/inverting unit 13. If the data input is intradata, a switch 14 switches the path to the side of an intra estimating unit 15, and an adder 16 adds data generated from an intra estimate by the intra estimating unit 15 and data output from the inverse quantization/inverting unit 13. On the other hand, if the data is interdata, the switch 14 switches the path to the side of the motion compensation estimating unit 17 and based on vector data and reference frame data, the adder 16 adds data generated from a motion compensation estimate by the motion compensation estimating unit 17 and data output from the inverse quantization/inverting unit 13. Data output from the adder 16 is stored to the frame buffer 19 through a deblocking filter 18.

FIG. 10 is a flowchart of a frame decoding process executed by the video decoder depicted in FIG. 8 or FIG. 9. The decoding process depicted in FIG. 10 is a process executed with respect to 1 frame. As depicted in FIG. 10, when the decoding process for a frame begins, it is determined whether stream input is normal or abnormal (step S1). If stream input is normal (step S1: normal), it is determined whether error recovery in is progress (step S2). If error recovery is not in progress (step S2: NO), steps S3 and S4 are executed for each block in a frame until all of the blocks in the frame are finished.

At step S3, it is determined whether stream input is normal or abnormal with respect to the blocks in the frame. If stream input is normal (step S3: normal), the next block is subject to processing. If stream input is abnormal (step S3: abnormal), the corresponding block of the frame previously output is output as is (step S4). When the process has been completed for each of the blocks in the frame, the decoding process for the frame ends and begins for the next frame.

On the other hand, if stream input is abnormal immediately after the decoding process for the frame begins (step S1: abnormal), the previously output frame is output as is (step S5), the decoding process for the frame ends and begins for the next frame.

If stream input is normal immediately after the decoding process for a frame begins, (step S1: normal) and error recover is in progress (step S2: YES), it is determined whether a key frame (I picture, IDR picture in H.264) has been detected (step S6). If a key frame has been detected (step S6: YES), error recovery is completed. In this case, steps S3 and S4 are executed for each block in a frame, the decoding process for the frame ends and begins for the next frame. On the other hand, if a key frame is not detected (step S6: NO), the frame previously output is output as is (step S7), the decoding process for the frame ends and begins for the next frame.

FIG. 11 is a schematic depicting the transitions of images displayed when an error is detected by the conventional video decoder. In FIG. 11, an image 21 is an image of a frame when, in the decoding process above, the result at step S1 is normal, at step S2: NO, and at step S3: normal. An image 22 is an image of a frame when, in the decoding process of the next frame, step S4 is executed when the result at step S3 is normal up to a given block, and at the given block, becomes abnormal. In the image 22, an image 23 occupying an upper portion up to the position of a detected error indicated by an arrow in FIG. 11 is an image from data decoded by the decoding process for the current frame. An image 24 occupying a lower portion from the position of the detected error is an image of the frame previously output. Images 25, 26, and 27 are images that have frozen when the result at step S1 is normal and step S5 is executed.

FIG. 12 is a schematic depicting the transitions of images displayed when an image is input from a key frame during error recovery by the conventional video decoder. In FIG. 12, an image 28 is an image frozen when the result at step S1 is abnormal. An image 29 is an image of a frame when the result at step S1 is normal, at step S2: YES, at step S6: YES, and at step S3: normal. In this way, stream input recovers and by the input of the key frame, the image suddenly moves. An image 30 is an image of frame when the result at step S1 is normal, at step S2: NO, and at step S3: normal.

FIG. 13 is a schematic depicting the transitions of images displayed when an image is input from a source other than a key frame during error recovery by the conventional video decoder. In FIG. 13, an image 31 is an image frozen when the result at step S1 is abnormal. Images 32, 33, and 34 are images frozen when the result at step S1 is normal, at step S2: YES, and at step S6: NO; and step S7 is executed. Thus, even if stream input recovers, the images remain frozen. When the images are frozen, P and B pictures of the stream that has been input are discarded. An image 35 is an image of a frame when, for the next frame, the result at step S1 is normal, at step S2: YES, at step S6: YES, and at step S3: normal. Thus, with stream input in a recovered state, through the input of a key frame, the image suddenly moves.

As described, in a broadcast transreceiver equipped with a conventional video decoder, if the reception state for a digital broadcast becomes poor, the video image suddenly freezes and even if the reception state recovers, the video image does not recover because the video image remains frozen until a key frame is input and decoded. Thus, the period that the video image remains frozen is prolonged and the continuity of the video image diminishes causing the video image to appear unnatural to the viewer.

Thus, a digital broadcast transreceiver has been disclosed that informs the viewer that the state of reception is deteriorating before the video image freezes to prevent the video image from suddenly freezing. The digital broadcast transreceiver has a function of correcting demodulated digital signals for errors and includes a detecting unit that detects the state of broadcast wave reception, and a reception state notifying unit that, before broadcast wave reception deteriorates beyond a range in which the error can be corrected, gives notification that the state of broadcast wave reception is deteriorating. Further, the reception state notifying unit includes a noise generating unit that generates noise and an adding unit that adds the noise to the video image (see, for example, paragraphs [0006] and [0009] of Japanese Laid-Open Patent Publication No. 2002-64759).

Further, a digital broadcast transreceiver has been disclosed that includes a freeze-determining unit which determines, based on the state of digital broadcast reception, the initiation and termination of freeze processing on the video image output, and a display control unit that, when the freeze processing is in progress, displays on a display screen, a freeze-notification screen subject to changes recognizable by the user. The display control unit generates a pseudo-noise screen that is altered such that the user recognizes the changes. In the digital broadcast transreceiver, the freeze-determining unit determines the initiation and terminal of the freeze processing based on the number of transport stream packets having errors (see, for example, paragraphs [0012], [0016], and [0052] to [0054] of Japanese Laid-Open Patent Publication No. 2005-260605).

Further, technology that prevents sudden disruption of a digital broadcast has been proposed. For example, the digital broadcast transreceiver disclosed in Japanese Laid-Open Patent Publication No. 2004-320394 (claim 8), includes an antenna that receives broadcast data that, as a countermeasure to packet loss, is multiplexed by temporally staggering the same content data constituted by packets having appended thereto headers that include index numbers; a demultiplexing unit that demultiplexes the broadcast data into the original content data to generate first content data and second content data; a storage unit that stores the second content data; a determining unit that determines packet loss for the first content data; a selecting unit that, when the determining unit determines that packet loss has occurred, selects from the second content data stored in the storage unit, packets corresponding to the index numbers of the lost packets, and a decoding unit that decodes data for reproduction from the packets selected by the selecting unit.

However, the digital broadcast transreceiver according to Japanese Laid-Open Patent Publication No. 2002-64759 has a problem in that if the input stream is not appended with error correction information, noise cannot be added to the video image. Further, even if the deterioration of the reception state does not exceed a range that the error can be corrected, i.e., is within a correctable range, noise is added to the video image. Moreover, a problem arises in the case of an apparatus that begins decoding from the I picture, there is no need for error correction during error recovery and if the I picture is not input, an image to which noise has not been added freezes.

Further, the digital broadcast transreceiver according to Japanese Laid-Open Patent Publication No. 2005-260605 has a problem in that although freeze processing is executed when there is a bit error in a transport stream packet, video stream is not addressed. Further, the digital broadcast transreceiver according to Japanese Laid-Open Patent Publication No. 2004-320394 has a problem in that the digital broadcast transreceiver cannot inform the user of deterioration in the reception state and further requires preparation of a storage unit to store the second content data.

SUMMARY

According to an aspect of an embodiment, a video decoder includes a storage unit that stores therein vector data; and a video generating unit that, when an input stream is abnormal, generates based on data before the input stream became abnormal and the vector data stored in the storage unit, an image that is an image displayed using the data before the input stream became abnormal and to which motion has been added.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings. The present invention is not limited by the embodiments.

Figure 1:
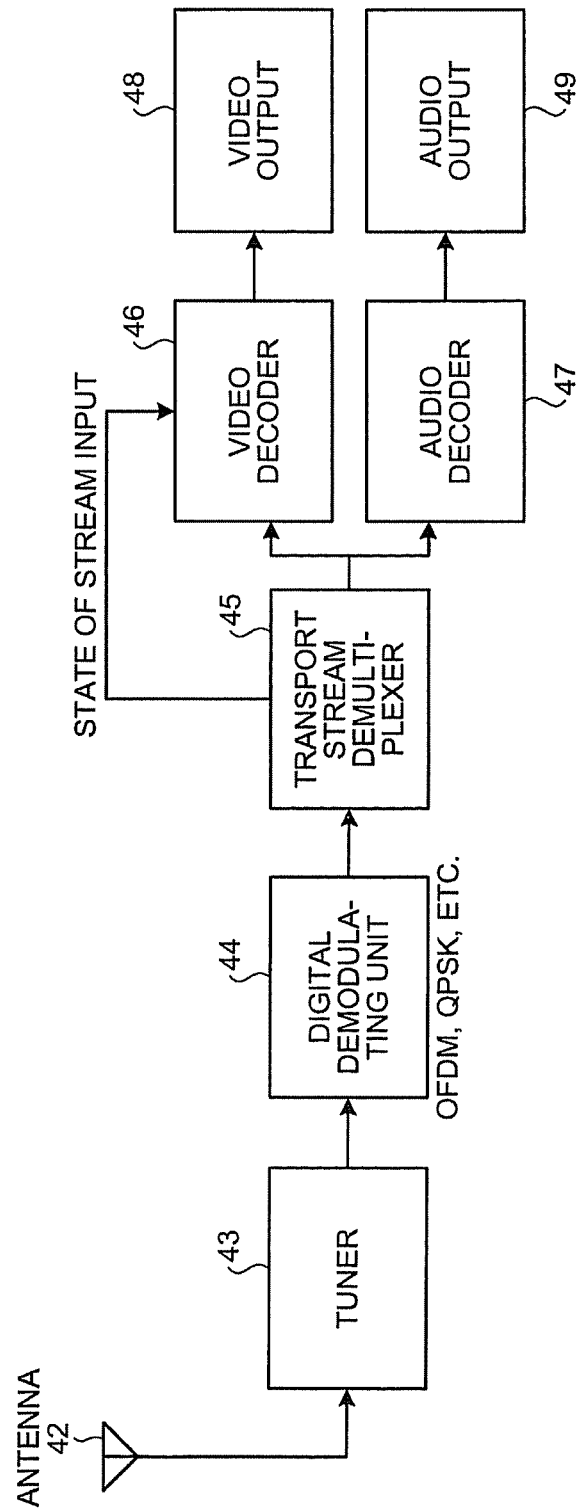
FIG. 1 is a schematic of a configuration of a digital broadcast transreceiver according to a first embodiment.

FIG. 1 is a schematic of a configuration of a digital broadcast transreceiver according to a first embodiment. As depicted in FIG. 1, a digital broadcast transreceiver 41 achieves video output 48 and audio output 49 by decoding a video stream and an audio stream by a video decoder 46 and an audio decoder 47, respectively, the video stream and the audio stream being obtained via a transport stream demultiplexer (TS-Demux) 45 that demultiplexes transport stream packets (TS packets) input through an antenna 42, a tuner 43, and a digital demodulating unit 44.

Operation of the video decoder 46 depends on the presence of transport stream packet input. Configuration and operation of the video decoder 46 will be described hereinafter. The transport stream demultiplexer 45, when there is transport stream packet input, reports that stream input to the video decoder 46 is normal; and when there is no transport stream packet input, reports that stream input to the video decoder 46 is abnormal. Accordingly, the transport stream demultiplexer 45 has a function of an output unit outputting the state of the input stream. In the transport stream demultiplexer 45, the state of error correction may be confirmed; however, error determination is executed internally by the video decoder 46 and thus, if an error occurs in the stream, the information concerning the error correction state is not used in video stream decoding.

Figure 2:
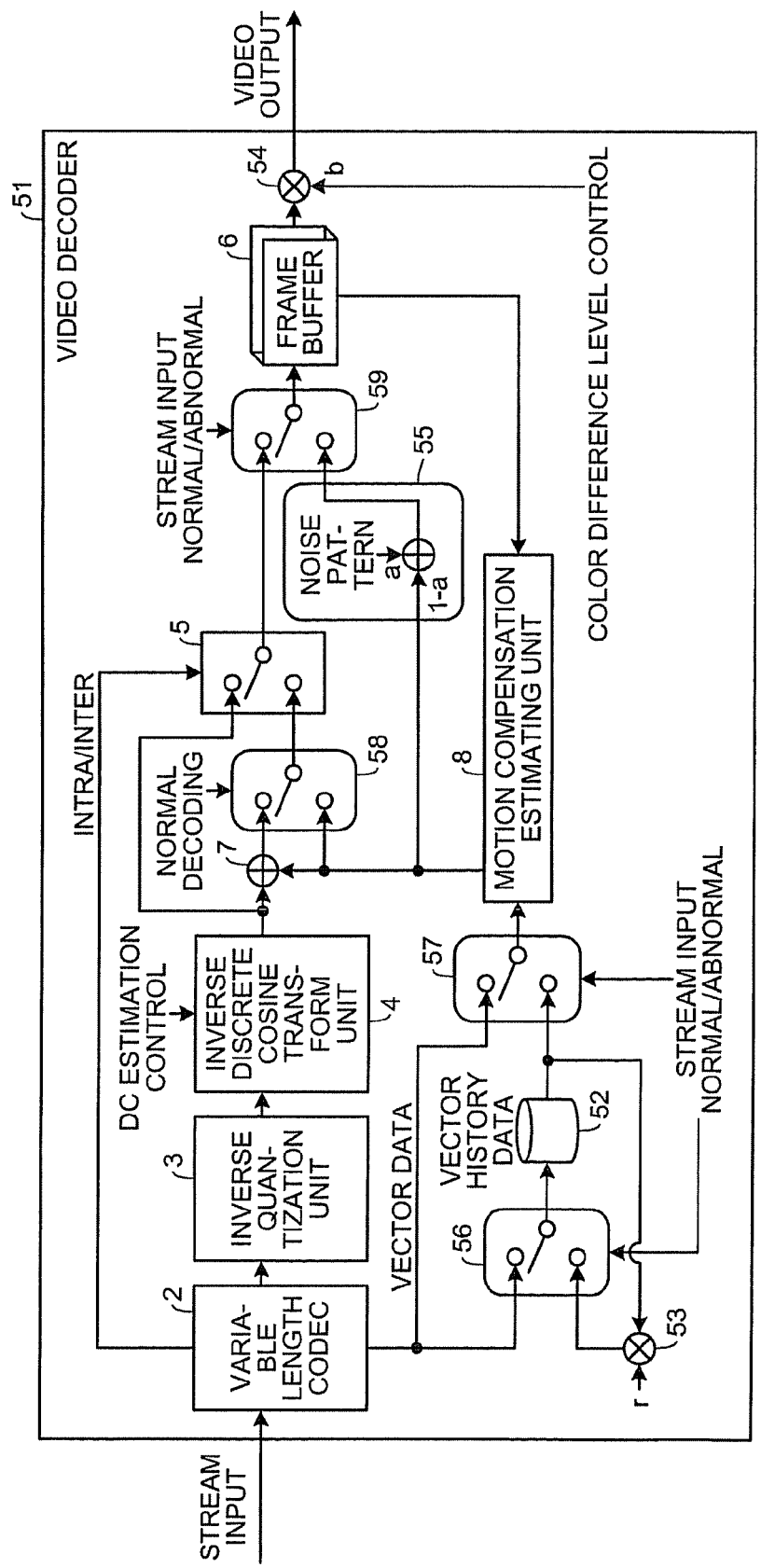
FIG. 2 is a schematic of a configuration of an MPEG video decoder according to the first embodiment.

FIG. 2 is a schematic of a configuration of an MPEG video decoder according to the first embodiment. Here, the video decoder 46 depicted in FIG. 1 is described as an MPEG-2 video decoder 51 (hereinafter, MPEG video decoder). Furthermore, strictly speaking, configuration of an MPEG-1 or an MPEG-4 video decoder differs from that of the MPEG video decoder 51, but is for the most part similar.

Figure 8:
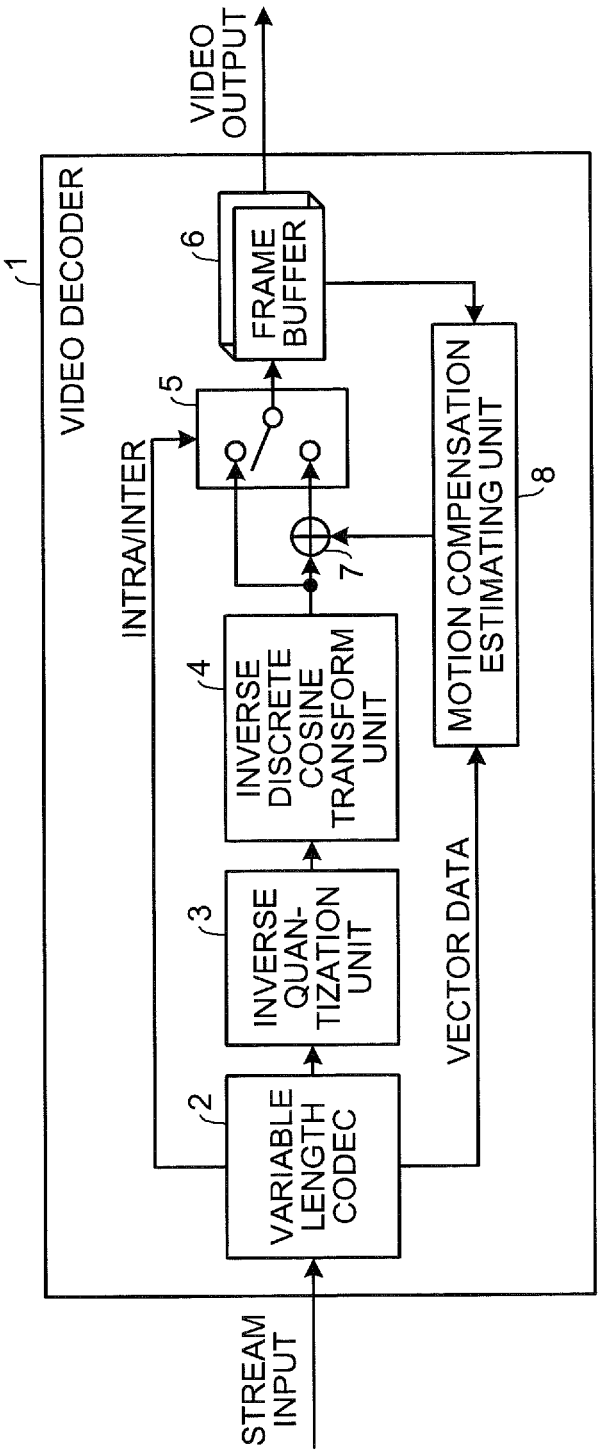
FIG. 8 is a diagram of a configuration of a conventional MPEG video decoder.

As depicted in FIG. 2, the MPEG video decoder 51, in addition to the configuration of the MPEG video decoder 1 depicted in FIG. 8, includes a memory 52, two multipliers 53 and 54, a weighted adder 55, and four switches 56, 57, 58, and 59. To distinguish these four switches 56, 57, 58, and 59 from the switch 5 provided to switch between data input paths to the frame buffer 6 according to data type, i.e., intradata and interdata, hereinafter the switch 5 provided in the conventional configuration is referred to as "first switch". Further, to distinguish the weighted adder 55 from the adder 7 provided to add data generated by the motion compensation estimating unit 8 and data output from the inverse discrete cosine transform unit 4, hereinafter the adder 7 provided in the conventional configuration is referred to as "first adder". Components identical to those depicted in FIG. 8 are given the same reference numerals used in FIG. 8 and description thereof is omitted hereinafter.

The memory 52 stores therein vector data output from the variable length codec 2. Accordingly, the memory 52 has a function of a storage unit storing therein vector data. The first multiplier 53 multiples the vector data stored in the memory 52 by an attenuation coefficient r. For example, vector values (signed values) are converted by the following equation, where the value of the attenuation coefficient r is greater than 0.0 and less than 1.0, and is not particularly limited and may be, for example, 0.8.

[vector value]=$r$×[vector value]

The product of the first multiplier 53 is stored to the memory 52 as new vector data. The second switch 56, if the state of stream input is normal, switches the path to the side of the variable length codec 2, and if the state of stream input is abnormal, switches the path to the side of the first multiplier 53. Accordingly, if the state of stream input is normal, vector data output from the variable length codec 2 is stored to the memory 52 and if the state of stream input is abnormal, vector data is multiplied by the attenuation coefficient r and the attenuated vector data is stored to the memory 52. The state of stream input, as described, is obtained from the transport stream demultiplexer 45 (refer to FIG. 1).

The third switch 57, if the state of stream input is normal, switches the path to the side of the variable length codec 2, and if the state of stream input is abnormal, switches the path to the side of the memory 52. Accordingly, if the state of stream input is normal, vector data output from the variable length codec 2 is input to the motion compensation estimating unit 8, and if the state of stream input is abnormal, vector data from the memory is input to the motion compensation estimating unit 8.

The fourth switch 58, if decoding is normal, switches the path to the side of the first adder 7, and if decoding is abnormal, switches the path to the side of the motion compensation estimating unit 8. Accordingly, for interdata, if decoding is normal on the side selected by the first switch 5, data output from the inverse discrete cosine transform unit 4 and data output from the motion compensation estimating unit 8 are added by the adder 7 and the sum is supplied, and if decoding is abnormal, output from the motion compensation estimating unit 8 is supplied. Information indicating whether decoding is normal is obtained from the variable length codec 2. Here, if DC estimation is not possible at the inverse discrete cosine transform unit 4, a given value such as an intermediate value is given as a DC component.

The second weighted adder 55 adds noise pattern data to data output from the motion compensation estimating unit 8. For example, luminance signals (unsigned value) of pixels are converted by the following equation, where the value of coefficient a is 0.0 or greater and 1.0 or less. If stream input is normal and error recovery is not in progress, the value of coefficient a is 0.0. If stream input is abnormal, the value of coefficient a is incremented for each frame processing unit, up to 1.0. The amount incremented is an arbitrary value that is not particularly limited and may be, for example, 0.01.

[luminance signal of pixel]=(1.0−$a$)×[luminance signal of pixel]+$a$×[noise pattern signal]

The fifth switch 59, if the state of stream input is normal, switches the path to the side of the first switch 5 and if the state of stream input is abnormal, switches the path to the side of the second weighted adder 55. Accordingly, if the state of stream input is normal, data output from the inverse discrete cosine transform unit 4 or data output from the inverse discrete cosine transform unit 4 added to data output from the motion compensation estimating unit 8 by the adder 7 is stored to the frame buffer 6. If the state of stream input is abnormal, data output from the motion compensation estimating unit 8 and to which noise pattern data is added by the second weighted adder 55 is stored to the frame buffer 6.

The second multiplier 54 multiples the color difference signal of video output, which is output from the frame buffer 6, by coefficient b and controls the level of color difference of the video output. For example, color difference signals (signed values) of pixels are converted by the following equation, where the value of coefficient b is 0.0 or greater and 1.0 or less. If stream input is normal and error recovery is not in progress, the value of coefficient b is 1.0. If stream input is abnormal, the value of coefficient b is decremented for each frame processing unit, down to 0.0. Further, if stream input is normal and error recovery is in progress, the value of coefficient b is incremented for each frame processing unit, up to 1.0. The amount incremented is an arbitrary value that is not particularly limited and may be, for example, 0.01.

[color difference signal of pixel]=$b$×[color difference signal of pixel]

The motion compensation estimating unit 8, the first multiplier 53, the second switch 56, the third switch 57, the fourth switch 58, the fifth switch 59, the variable length codec 2, the inverse quantization unit 3, the first switch 5, the memory 52, and the inverse discrete cosine transform unit 4 have a function of a video generating unit. Further, the second multiplier 54 and the second weighted adder 55 have a function of a notifying unit.

Figure 3:
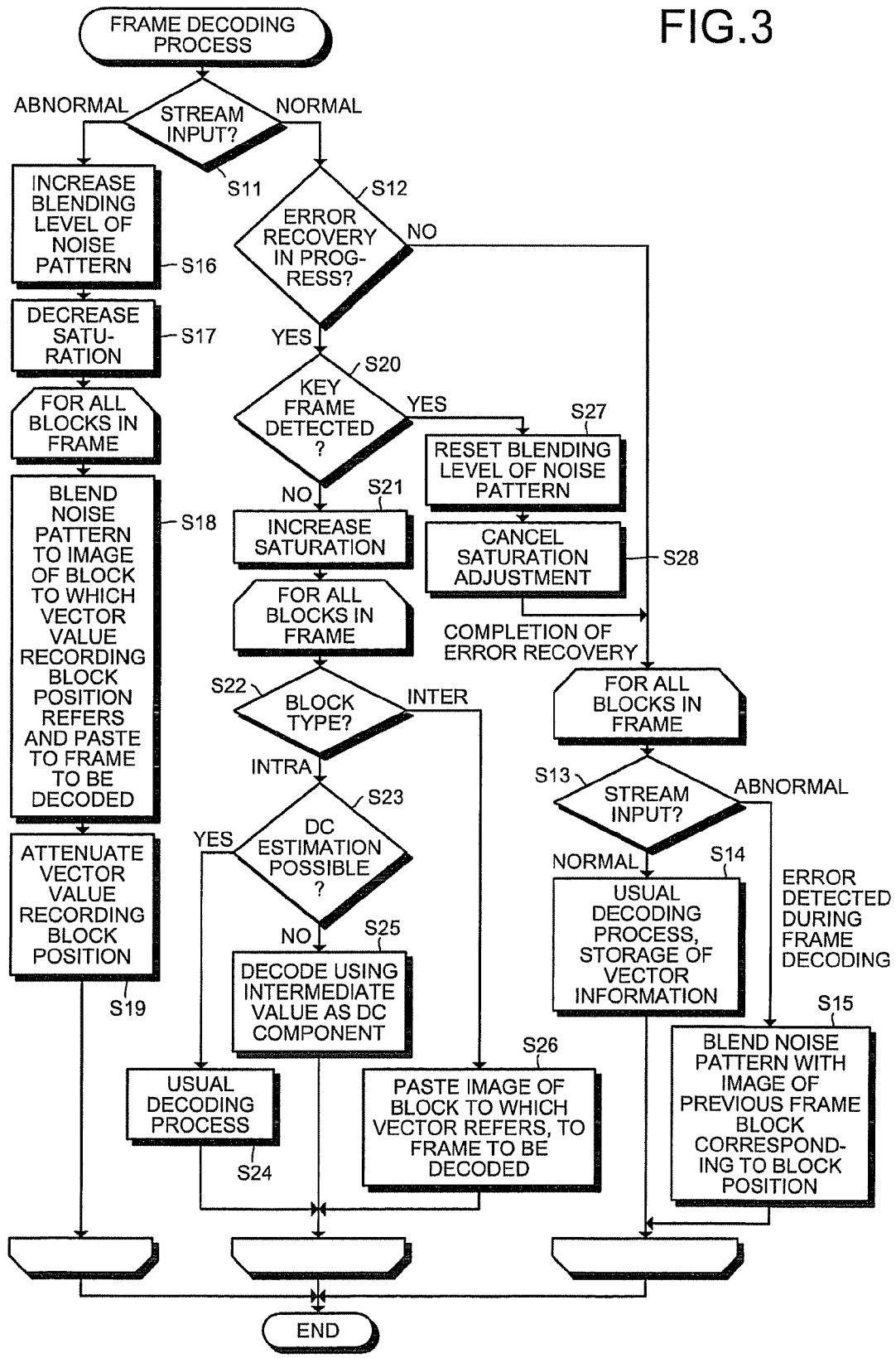
FIG. 3 is a flowchart of a frame decoding process executed by the video decoder.

FIG. 3 is a flowchart of a frame decoding process executed by the video decoder according to the first embodiment. The decoding process depicted in FIG. 3 is performed with respect to 1 frame. As depicted in FIG. 3, when the decoding process begins for a frame, it is determined whether stream input is normal or abnormal (step S11). If stream input is normal (step S11: normal), it is determined whether error recovery is in progress (step S12). If error recovery is not is progress (step S12: NO), step S13 and, step S14 or step S15 are executed for each block in the frame until all of the blocks in the frame are finished.

At step S13, it is determined whether stream input is normal or abnormal with respect to the blocks in the frame. If stream input is normal (step S13: normal), the decoding process is executed as usual, data is stored to the frame buffer 6, and vector data is stored to the memory 52 (step S14); and the next block is subject to processing. If stream input is abnormal (step S13: abnormal), data of the corresponding block position of the previous frame is read from the frame buffer 6 and the second weighted adder 55 adds noise pattern data to the read data and saves the result to the frame buffer 6 (step S15). Through the addition of noise pattern data to image data, a noise pattern can be superimposed on (blended with) the image. When the process has been completed for each of the blocks in the frame, the decoding process for the frame ends, and begins for the next frame.

On the other hand, if stream input is abnormal immediately after the decoding process for the frame begins (step S11: abnormal), coefficient a used for blending a noise pattern to an image is incremented for each frame processing unit, and the second weighted adder 55 increases the level of the noise pattern blended (step S16). Further, the second multiplier 54 decrements, for each frame processing unit, coefficient b used for controlling the color difference level, and decreases the saturation of the image (step S17). Steps S18 and S19 are executed until each block in the frame is finished.

At step S18, vector data of the block position is read from the memory 52, the second weighted adder 55 blends a noise pattern to the image of the block to which the read vector data refers, pastes the image to the frame to be decoded, and stores the result to the frame buffer 6 (step S18). The first multiplier 55 multiples the vector data used here by the attenuation coefficient r, attenuates the vector data, and stores the attenuated vector data to the memory 52 (step S19). The decoding process for the frame ends and begins for the next frame.

If stream input is normal immediately after the decoding process for the frame begins (step S11: normal) and error recovery is in progress (step S12: YES), it is determined whether a key frame has been detected (step S20). If a key frame has not been detected (step S20: NO), the second multiplier 54, for each frame processing unit, increments coefficient b used for controlling the color difference level, and increases the saturation of the image (step S21). Steps S22 and S23, and step S24 or S25; or steps S22 and S26 are executed until each block in the frame is finished.

At step S22, it is determined whether the data of the block is intradata or interdata (step S22). If the data of the block is intradata (step S22: Intra), it is determined whether DC estimation is possible (step S23). If DC estimation is possible (step S23: YES), the decoding process is executed as usual and the data is stored to the frame buffer 6 (step S24). If DC estimation is not possible (step S23: NO), the inverse discrete cosine transform unit 4 is provided a given value as a DC component, e.g., an intermediate value, and the inverse discrete cosine transform unit 4 executes the decoding process and stores the data to the frame buffer 6 (step S25).

At step S22, if the data of the block is interdata (step S22: Inter), vector data of the block is read from the memory 52, the data of the block to which the read vector data refers is pasted to the frame to be decoded, and the result is stored to the frame buffer 6 (step S26). The decoding process for the frame ends and begins for the next frame.

On the other hand, at step S20, if a key frame is detected (step S20: YES), the value of coefficient a used by the second weighted adder 55 is returned to 0.0 to reset the blending level of the noise patterned blended to the image (step S27). The value of coefficient b used by the second multiplier 54 is returned to 1.0 to cancel the adjustment of the saturation of the image (step S28), thereby ending error recovery. In this case, step S13 and, step S14 or step S15 are executed for each block of the frame; the decoding process for the frame ends and begins for the next frame.

In the decoding process described, when stream input is abnormal, the frame rate may adjusted through execution and suspension (at display frame time units) of the decoding process involving the processes of blending a noise pattern, color-difference control, and attenuating vector data. In this case, configuration may be such that when stream input is normal, p frames per second are output, where p is positive integer greater than 2. In this case, frames are output at intervals of 1/p seconds. When stream input is abnormal, the decoding process is executed at intervals of q/p seconds and output frames are updated.

Thus, the frame rate becomes 1/q, where q is a positive integer greater than 1 and is incremented every m frames after stream input has become abnormal. m is an arbitrary positive integer that is not particularly limited and may be, for example, 1. When stream input returns to normal, the value of q is reset to 1. Thus, if stream input becomes abnormal, the frame rate is decreased and thus, video having an unnatural appearance to the viewer can be prevented and since the video decoder is temporarily stopped, power consumption can be reduced.

Figure 4:
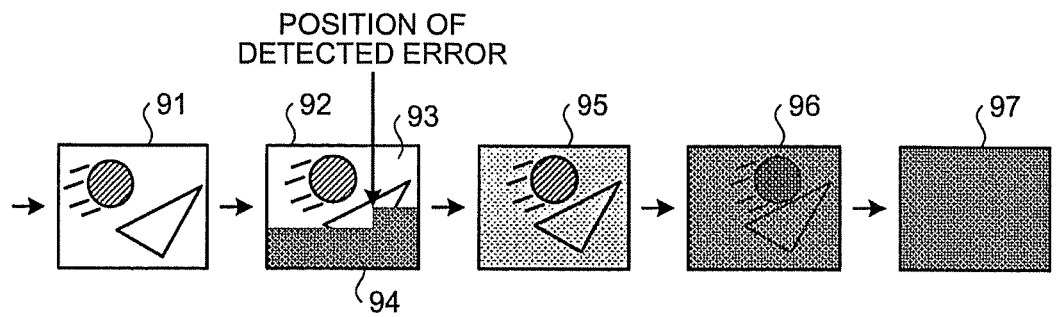
FIG. 4 is a schematic depicting the transitions of images displayed when an error is detected by the video decoder.

FIG. 4 is a schematic depicting the transitions of images displayed when an error is detected by the video decoder according to the first embodiment. In FIG. 4, an image 91 is an image of a frame when, in the decoding process depicted in FIG. 3, the result at step S11 is normal, at step S12: NO, at step S13: normal, and step S14 is executed. An image 92 is an image of a frame when, in the decoding process of the next frame, step S15 is executed when up to a given block, the result at step S13 is normal and at the given block becomes abnormal. In the image 92, an image 93 occupying an upper portion up to the position of a detected error indicated by an arrow in FIG. 4 is an image from data decoded by the decoding process for the current frame. An image 94 occupying a lower portion from the position of the detected error is an image of the frame previously output blended with a noise pattern.

Images 95, 96, and 97 are images of frames when the result at step S11 is abnormal and steps S16 to S19 are executed. Here, after detection of stream input becoming abnormal, vector history data when stream input was normal is used to form an image to which inertial motion is added. Through attenuation of the history data of the motion vector, sudden freezing of the video is prevented and the video does not appear unnatural to the viewer.

Over time with the progression of the images, as depicted by images 95, 96, and 97, the level of noise pattern blending to the images of the frames displayed is gradually increased, while with respect to color information of the images, saturation is gradually decreased. Further, the frame rate may be gradually decreased. Thus, the viewer can be notified that the reception state is becoming poor.

Figure 5:
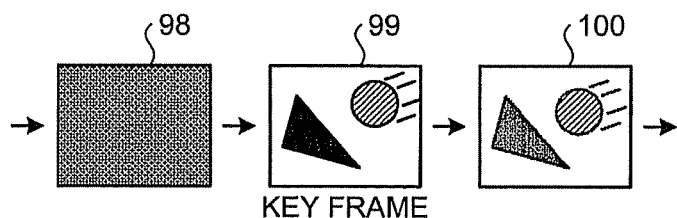
FIG. 5 is a schematic depicting the transitions of images displayed when an image is input from a key frame during error recovery by the video decoder.

FIG. 5 is a schematic depicting the transitions of images displayed when an image is input from a key frame during error recovery by the video decoder according to the first embodiment. In FIG. 5, an image 98 is an image when the result at step S11 is abnormal and steps S16 to S19 are executed. A noise pattern is blended to the image 98. An image 99 is an image of a frame when the result at step S11 is normal, at step S12:YES, and at step S20:YES; and steps S27 and S28 are executed as well as step S14 when the result at step S13 is normal. An image 100 is an image of a frame when the result at step S11 is normal, at step S12: NO, and at step S13: normal; and step S14 is executed.

Figure 6:
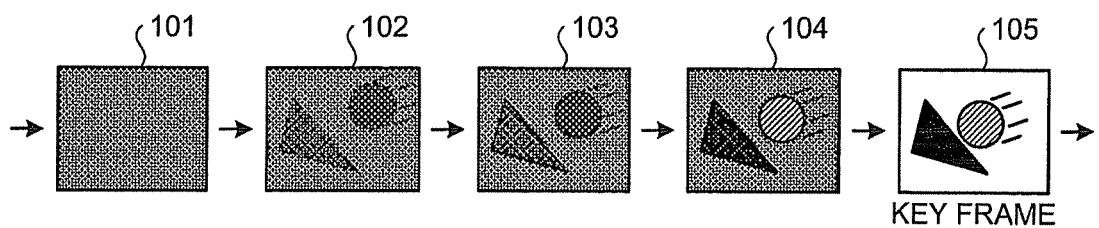
FIG. 6 is a schematic depicting the transitions of images displayed when an image is input from a source other than a key frame during error recovery by the video decoder.

FIG. 6 is a schematic depicting the transitions of images displayed when an image is input from a source other than a key frame during error recovery by the video decoder according to the first embodiment. In FIG. 6, an image 101 is an image of a frame when the result at step S11 is abnormal and steps S16 to S19 are executed. Images 102, 103, and 104 are images of frames when the result at step S11 is normal, at step S12: YES, and at step S20: NO; and steps S21 to S26 are executed. An image 105 is an image of a frame when, in the decoding process of the next frame, the result at step S11 is normal, at step S12:YES, and at step S20:YES; and steps S27 and S28 are executed as well as step S14 when the result at step S13 is normal.

After stream input has recovered and until the input of a key frame, vector data alone is used for interdata blocks. On the contrary, for intradata blocks, the decoding process is executed as usual or by setting the DC component to an intermediate value to display motion of a block maximally using usable data among the received data, where the saturation of the intradata blocks is gradually increased from achromatic, thereby notifying the viewer that the reception state has improved.

Figure 7:
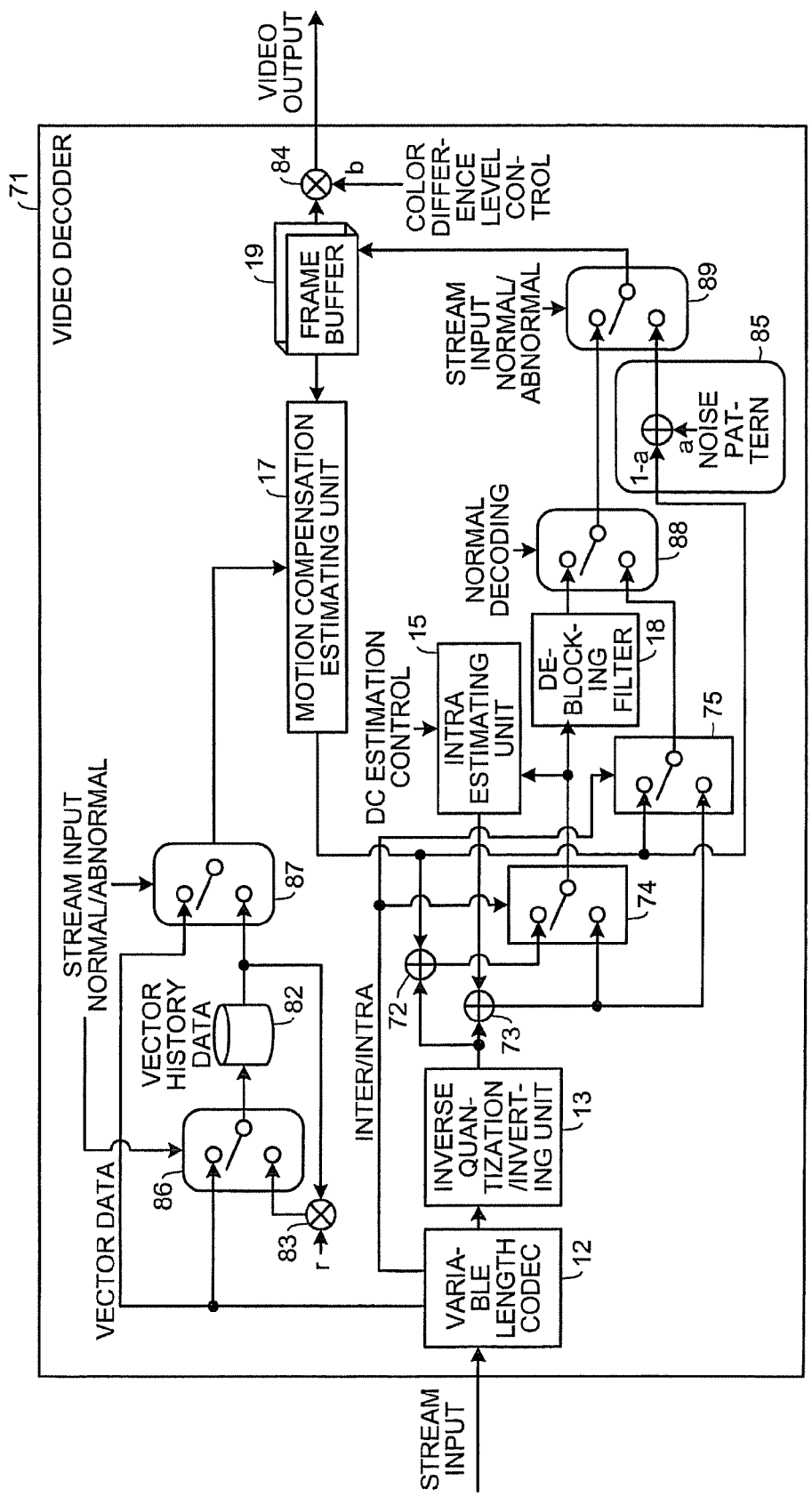
FIG. 7 is a schematic of a configuration of an H.264 video decoder according to a second embodiment.
Figure 9:
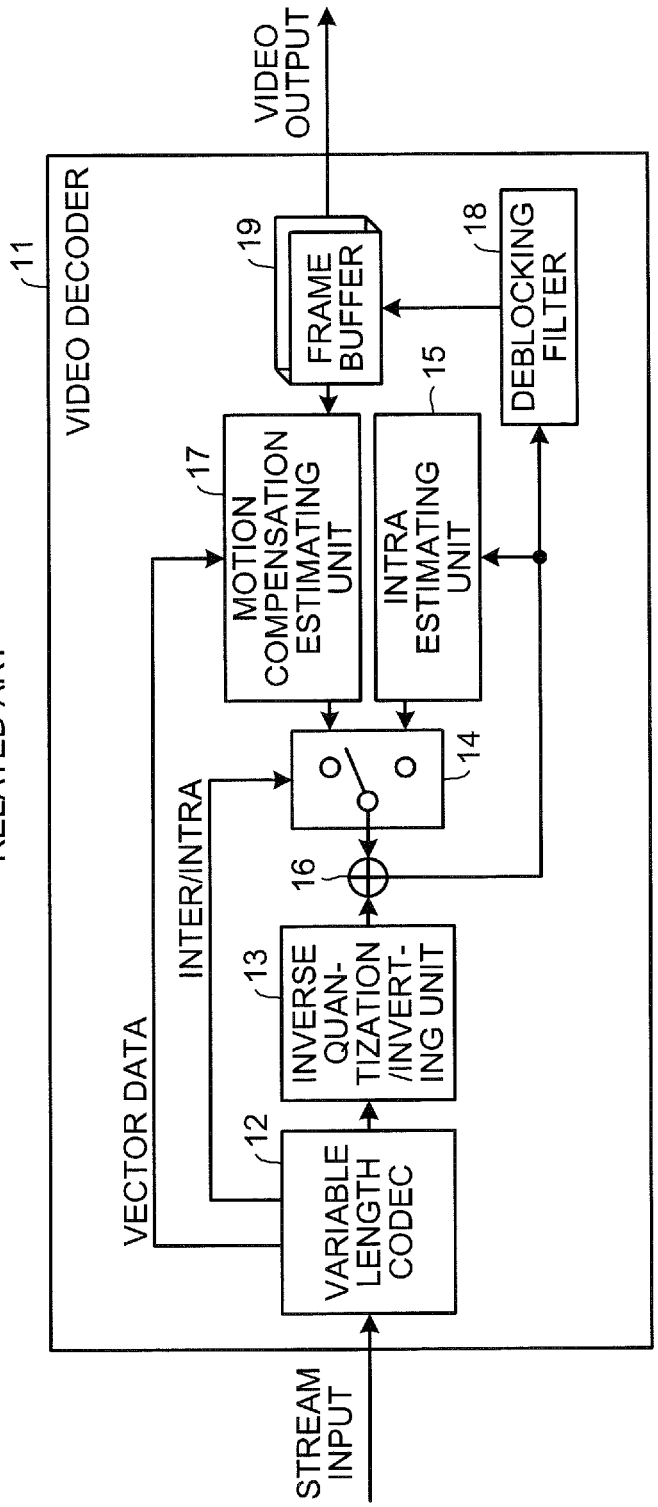
FIG. 9 is a diagram of a configuration of a conventional H.264 video decoder.
Figure 10:
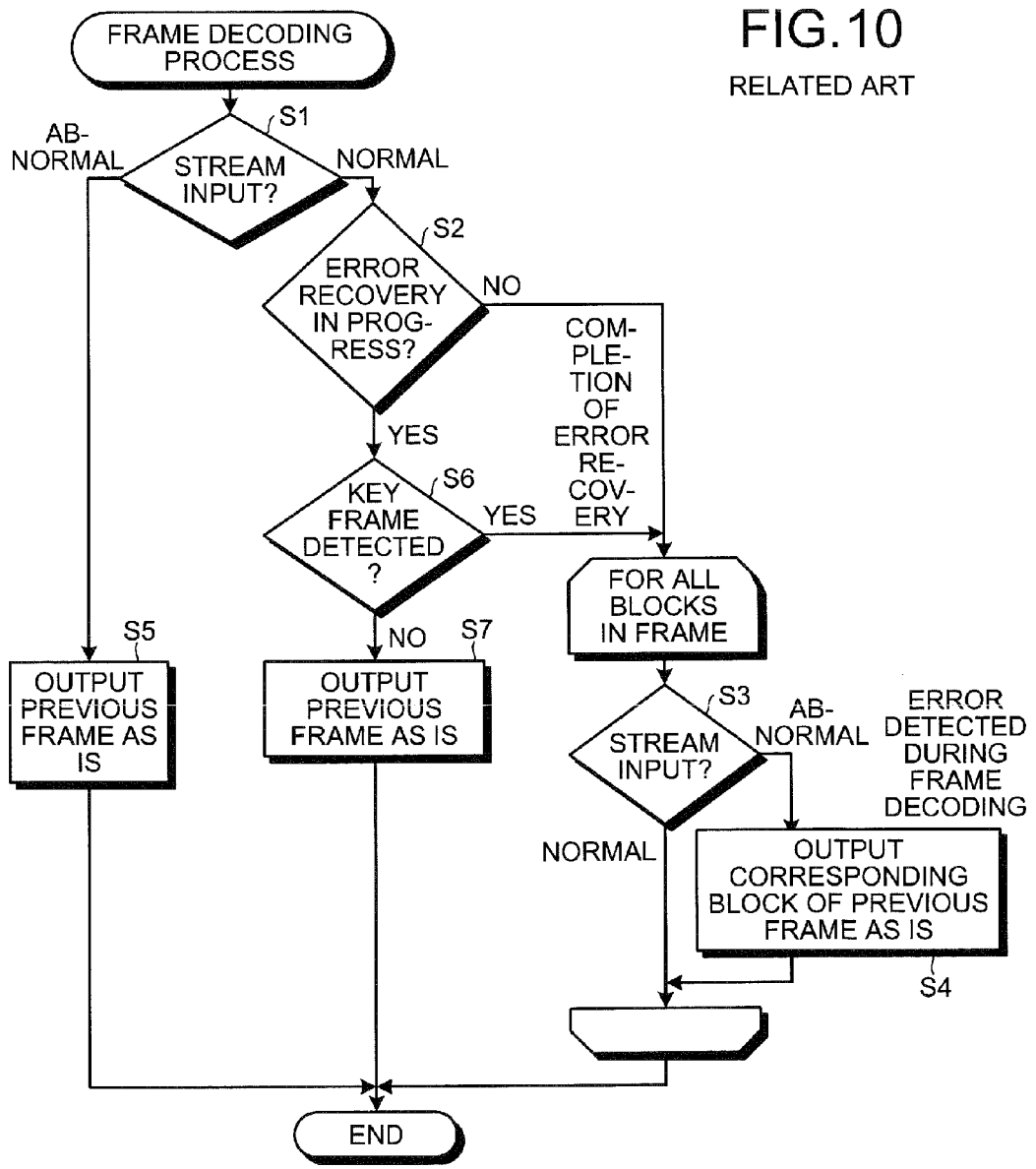
FIG. 10 is a flowchart of a frame decoding process executed by a video decoder.
Figure 11:
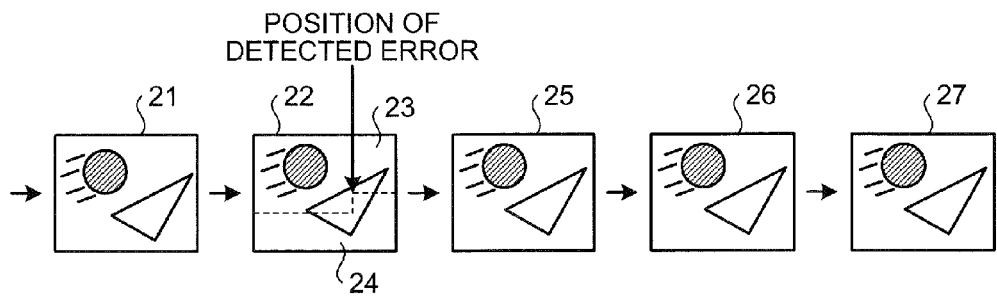
FIG. 11 is a schematic depicting the transitions of images displayed when an error is detected by a conventional video decoder.
Figure 12:
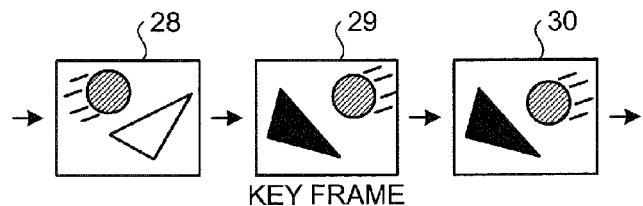
FIG. 12 is a schematic depicting the transitions of images displayed when an image is input from a key frame during error recovery by a conventional video decoder.
Figure 13:
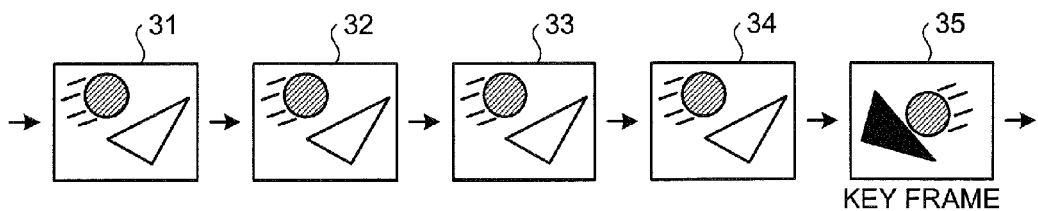
FIG. 13 is a schematic depicting the transitions of images displayed when an image is input from a source other than a key frame during error recovery by conventional video decoder.

FIG. 7 is a schematic of a configuration of an H.264 video decoder according to a second embodiment. In the second embodiment, the video decoder 46 depicted in FIG. 1 is explained as an H.264 video decoder 71. As depicted in FIG. 7, as compared to the configuration of the H.264 video decoder 11 depicted in FIG. 9, the H.264 video decoder 71 includes a first switch A 74 and a first switch B 75 in place of the switch 14, a first adder A 72 and a first adder B 73 in place of the adder 16 in the configuration depicted in FIG. 9, and additionally includes a memory 82, two multipliers 83 and 84, a weighted adder 85, and four switches 86, 87, 88, and 89. Components identical to those of the conventional configuration depicted in FIG. 9 are given the same reference numerals used in FIG. 9, and descriptions thereof are omitted hereinafter.

Descriptions of the memory 82, the first multiplier 83, the second switch 86, and the third switch 87 are identical to those of the memory 52, the first multiplier 53, the second switch 56, and the third switch 57 of the first embodiment and are omitted hereinafter. The memory 82 has a function as a storage unit storing therein vector data. The first adder A 72 adds data output from the inverse quantization/inverting unit 13 and data generated from a motion compensation estimate by the motion compensation estimating unit 17 and based on vector data and data of the previous frame. The first adder B 73 adds data output from the inverse quantization/inverting unit 13 and data generated from an intra estimate by the intra estimating unit 15.

The first switch A 74 switches the path to the side of the first adder A 72 when the data input is interdata, and switches the path to the side of the first adder B 73 when the data input is intradata. Data output from the first switch A 74 is sent to the intra estimating unit 15 and the deblocking filter 18. The first switch B 75 switches the path to the side of the motion compensation estimating unit 17 when the data input is interdata, and switches the path to the side of the first adder B 73 when the data input is intradata. Data output from the first switch B 75 is sent to the fourth switch 88.

The fourth switch 88 switches the path to the side of the deblocking filter 18 when the decoding is normal, and switches the path to the side of the first switch B 75 when the decoding is abnormal. Data output from the fourth switch 88 is sent to the fifth switch 89. The second weighted adder 85 is identical to the second weighted adder 55 of the first embodiment and description thereof is omitted hereinafter. The fifth switch 89 switches the path to the side of the fourth switch 88 when the state of stream input is normal, and switches the path to the side of the second weighted adder 85 when the state of stream input is abnormal. The second multiplier 84 is identical to the second multiplier 54 of the first embodiment and description thereof is omitted hereinafter.

The motion compensation estimating unit 17, the first multiplier 83, the second switch 86, the third switch 87, the fourth switch 88, the fifth switch 89, the variable length codec 12, the inverse quantization/inverting unit 13, the first adder A 72, the first switch A 74, the first switch B 75, the deblocking filter 18, the memory 82, and the intra estimating unit 15 have a function as a video generating unit. Further, the second multiplier 84 and the second weighted adder 85 have a function as a notifying unit.

Flow of the frame decoding process executed by the H.264 video decoder 71 of the configuration described above is identical to that depicted in FIG. 3 and description thereof is omitted hereinafter. Further, when an error is detected, the transitions of images displayed when an image is input from a key frame during error recovery and the transitions when an image is input from a source other than a key frame during error recovery are respectively similar to the examples depicted in FIGS. 4 to 6, and description thereof is omitted hereinafter.

In the first and the second embodiments, when abnormal stream input is detected, processing for noise pattern blending is executed; however, configuration is not limited hereto and other image processing may be executed provided the viewer is notified that the reception state is becoming poor. For example, configuration may be such that the resolution of a block when stream input has become abnormal is adjusted and a mosaic-like image may be displayed when the reception state becomes poor.

The embodiments are applicable for reducing the time for changing channels of digital broadcasts. If a digital broadcast transreceiver has only one system of a tuner and transport stream demultiplexer and the channel is changed, it takes time for the video to actually begin. One characteristic of the embodiments is the reduction of the time taken from the changing of a channel to the display of the video by adopting operation after stream input has recovered. In this case, until the key frame is decoded, an image encouraging inference by the viewer is displayed.

Typically, when a channel is changed, if information (sequence information) concerning video size, etc. of the video stream is not extracted, a video decoder cannot be operated properly. However, if video size information is extracted in advance from program information for a channel and the video decoder is set up, the video decoder can be operated even before sequence information is extracted. Thus, an image encouraging inference by the viewer is displayed. In addition to digital broadcasts, the embodiments are further applicable to live network broadcasts. In such application, an upstream portion block from the transport stream demultiplexer is a network receiving unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A video decoder comprising:
   a memory configured to store therein vector data for each input frame; and
   a video generator configured to, when an input stream of an input frame is detected to be abnormal, generate, based on image data of a previous frame input before the input stream became abnormal and attenuated vector data obtained by attenuating the vector data of the previous frame stored in the memory, an image that is the image data of the previous frame to which motion has been added, wherein the video generator comprises:
   a motion compensation estimator;
   a first switch configured to, when the input stream of the input frame is detected to be abnormal, output the attenuated vector data to the motion compensation estimating estimator; and
   an adder configured to perform addition of data output from the motion compensation estimator to the image data of the previous frame.

2. The video decoder according to claim 1 further comprising a notifying circuit configured to provide notification that with respect to the image generated by the video generator, the input stream is abnormal.

3. The video decoder according to claim 2, wherein the notifying circuit is configured to superimpose a noise pattern on the image generated by the video generator.

4. The video decoder according to claim 2, wherein the notifying circuit is configured to reduce saturation of the image generated by the video generator.

5. The video decoder according to claim 2, wherein the notifying circuit is configured to change frame rate every given number of frames.

6. The video decoder according to claim 2, wherein the notifying circuit is configured to execute image processing on the image generated by the video generator to inform a viewer that a state of reception is deteriorating.

7. The video decoder according to claim 1, wherein the video generator sets a DC component to a given value and generates the image, when after the input stream has recovered to a normal state from an abnormal state, data of a block of the input frame is intradata and DC estimation is impossible.

8. The video decoder according to claim 1, wherein the video generator, when after the input stream has recovered to a normal state from an abnormal state and data of a given block of the input frame is interdata, uses and stores into a frame buffer as data of the frame, data of a block to which the vector data of the given block refers.

9. The video decoder according to claim 1, wherein the generator stores the attenuated vector data into the memory.

10. A digital broadcast transreceiver comprising:
    an output unit configured to output a state of an input stream;
    a memory configured to store therein vector data for each input frame; and
    a video generator configured to upon receiving from the output unit, information indicating that the input stream is abnormal, generate based on image data of a previous frame input before the input stream became abnormal and attenuated vector data obtained by attenuating the vector data of the previous frame stored in the memory, an image that is the image data of the previous frame to which motion has been added, wherein
    the video generator comprises:
    a motion compensation estimator;
    a first switch configured to, when the input stream of the input frame is detected to be abnormal, output the attenuated vector data to the motion compensation estimating estimator; and
    an adder configured to perform addition of data output from the motion compensation estimator to the image data of the previous frame.

11. The digital broadcast transreceiver according to claim 10 further comprising a notifying circuit configured to provide notification that with respect to the image generated by the video generator, the input stream is abnormal.

12. The digital broadcast transreceiver according to claim 11, wherein the notifying circuit is configured to superimpose a noise pattern on the image generated by the video generator.

13. The digital broadcast transreceiver according to claim 11, wherein the notifying circuit is configured to reduce saturation of the image generated by the video generator.

14. The digital broadcast transreceiver according to claim 11, wherein the notifying circuit is configured to change frame rate every given number of frames.

15. The digital broadcast transreceiver according to claim 11, wherein the notifying circuit is configured to execute image processing on the image generated by the video generator to inform a viewer that a state of reception is deteriorating.

16. The digital broadcast transreceiver according to claim 10, wherein the video generator sets a DC component to a given value and generates the image, when after the input stream has recovered to a normal state from an abnormal state, data of a block of the input frame is intradata and DC estimation is impossible.

17. The digital broadcast transreceiver according to claim 10, wherein the video generator, when after the input stream has recovered to a normal state from an abnormal state and data of a given block of the input frame is interdata, uses and stores into a frame buffer as data of the frame, data of a block to which the vector data of the given block refers.

18. The digital broadcast transreceiver according to claim 10, wherein the generator stores the attenuated vector data into the memory.

* * * * *